(12) United States Patent
Bogh et al.

(10) Patent No.: US 9,587,893 B2
(45) Date of Patent: Mar. 7, 2017

(54) AIR INTRODUCTION SYSTEM AND METHOD FOR COOLING TOWERS

(76) Inventors: Pery Bogh, S'Agaro (ES); Peter Graf, Kuessaberg (DE); Klemens Fisch, Unterentfelden (CH)

( * ) Notice: Subject to any disclaimer, the term of this patent is extended or adjusted under 35 U.S.C. 154(b) by 471 days.

(21) Appl. No.: 13/882,866

(22) PCT Filed: Nov. 2, 2011

(86) PCT No.: PCT/EP2011/069205
§ 371 (c)(1),
(2), (4) Date: May 1, 2013

(87) PCT Pub. No.: WO2012/059496
PCT Pub. Date: May 10, 2012

(65) Prior Publication Data
US 2013/0228941 A1    Sep. 5, 2013

(30) Foreign Application Priority Data
Nov. 2, 2010  (EP) .................................. 10014199

(51) Int. Cl.
| | | |
|---|---|---|
| *F28F 25/12* | (2006.01) | |
| *E04H 5/12* | (2006.01) | |
| *F28C 1/00* | (2006.01) | |
| *F28F 25/00* | (2006.01) | |
| *B23P 15/26* | (2006.01) | |

(52) U.S. Cl.
CPC .............. *F28F 25/12* (2013.01); *B23P 15/26* (2013.01); *E04H 5/12* (2013.01); *F28C 1/00* (2013.01); *F28F 25/00* (2013.01); *F28F 2250/02* (2013.01); *Y10T 29/49352* (2015.01)

(58) Field of Classification Search
CPC .................................. B23P 15/26; F28F 25/12
USPC ........................................................ 261/159
See application file for complete search history.

(56) References Cited

U.S. PATENT DOCUMENTS 6,880,622 B1 * 4/2005 Gu ............................ F28C 1/04
                                                                165/60

FOREIGN PATENT DOCUMENTS

| DE | 1059941 | 6/1959 |
|---|---|---|
| DE | 1235343 | 3/1967 |
| DE | 1501396 | 12/1969 |
| FR | 2598208 | 11/1987 |
| GB | 374077 | 5/1932 |

(Continued)

OTHER PUBLICATIONS

International Search Report dated May 8, 2012 issued for International application No. PCT/EP2011/069205.

*Primary Examiner* — Duane Smith
*Assistant Examiner* — Adam W Bergfelder
(74) *Attorney, Agent, or Firm* — Garrett James O'Sullivan

(57) ABSTRACT

A system and a method for promoting improved air flow through a cooling tower and reduced inner air pressure losses caused by rain in the rain zone of a cooling tower. Aerodynamic modules are mounted on the lower edge of the cooling tower shell in order to deflect the downward-flowing air about the lower edge of the tower shell and into the rain zone. The aerodynamic modules can be modularly mounted, can be replaced, and do not affect the statics of the tower shell. Aerodynamic modules can also be built on the base area to deflect the incoming air over any obstacles. Troughs or dripping elements can also promote flow by reducing the rain falling in an outer area.

10 Claims, 11 Drawing Sheets

(56) References Cited

FOREIGN PATENT DOCUMENTS

GB 854013 11/1960

\* cited by examiner

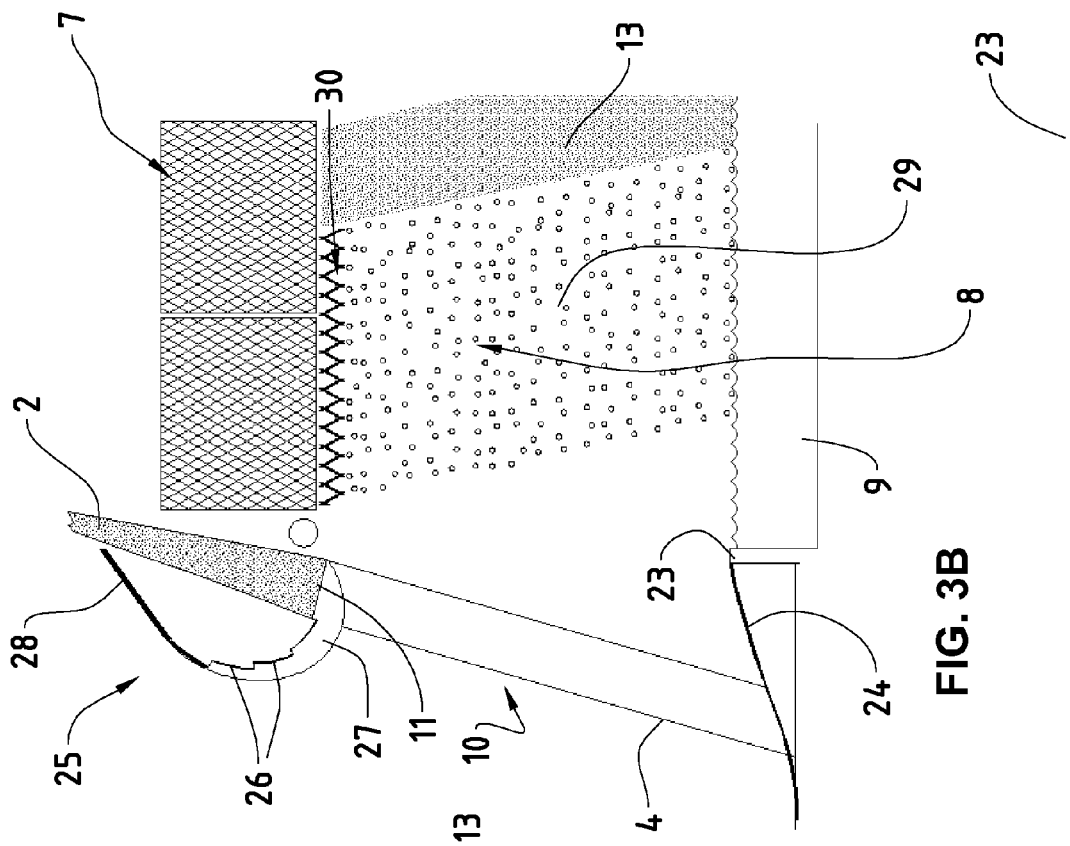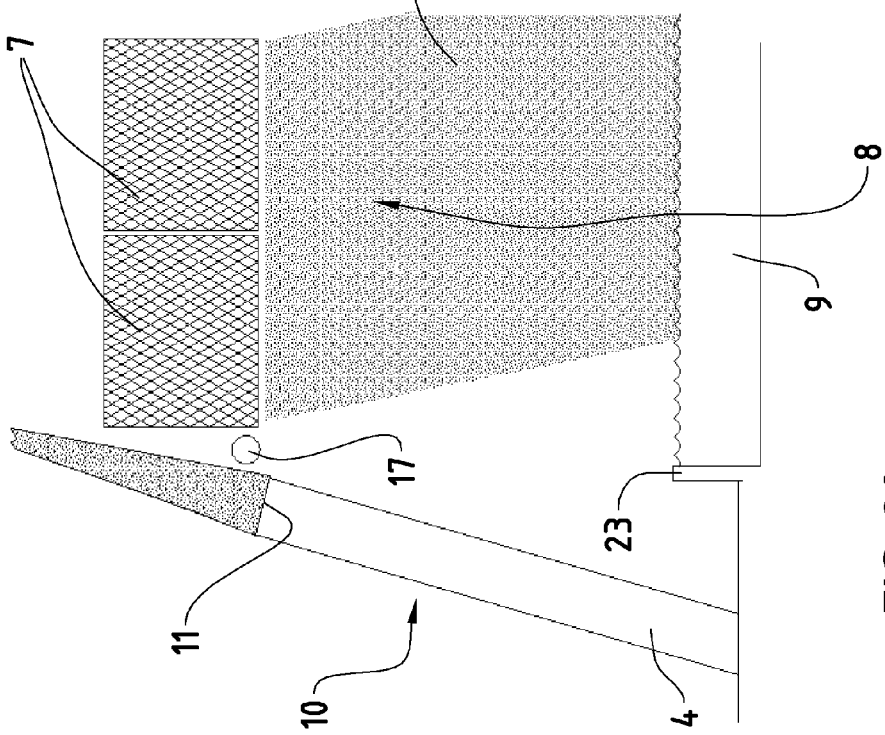

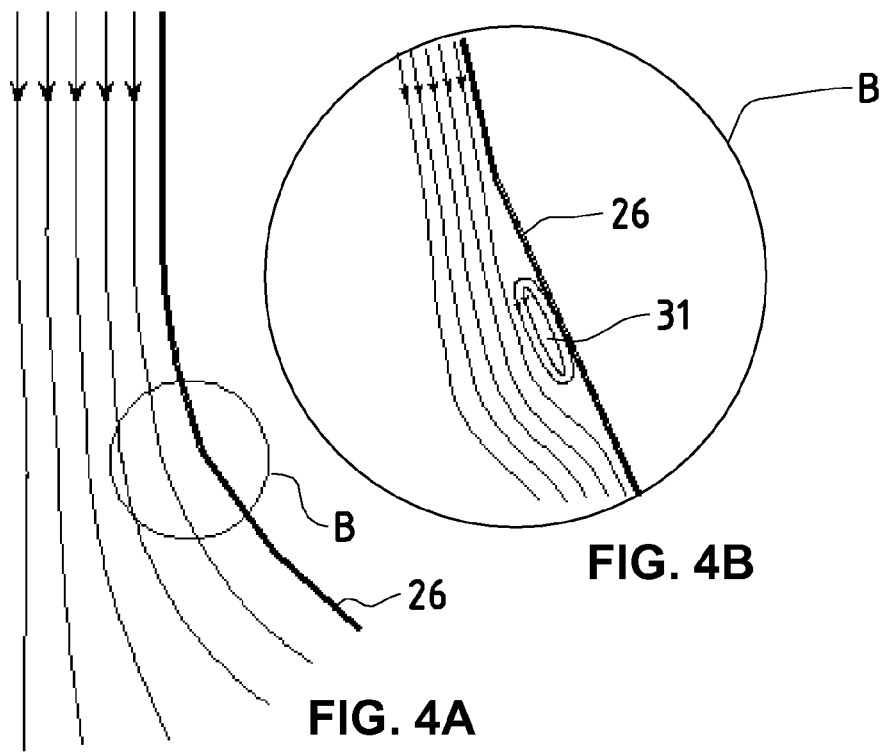
FIG. 4A
FIG. 4B
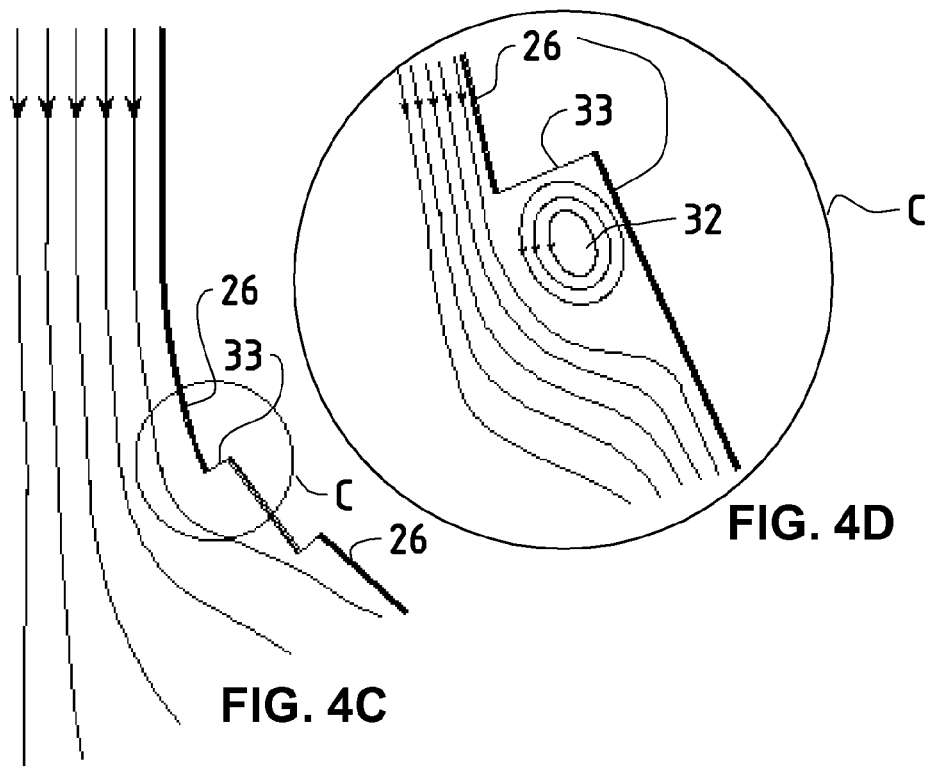
FIG. 4C
FIG. 4D

AIR INTRODUCTION SYSTEM AND METHOD FOR COOLING TOWERS

RELATED APPLICATION

This application is a 371 of international application PCT/EP2011/069205, filed Nov. 2, 2011, and claims priority from EP application 10014199.3, filed Nov. 2, 2010, which is incorporated herein by reference in its entirety.

This invention relates to the discharge of waste heat from plants such as, for example, power plants and industrial plants. It relates in particular, but not exclusively however, to the conducting of cooling air through so-called wet or natural draft cooling towers.

BACKGROUND ART

To achieve a high degree of efficiency of work machines that are subject to the Clausius-Rankine cycle, such as e.g. steam turbines, it is necessary to carry out the steam/liquid phase transition of the working fluid in the power plant condenser at as low a condensation temperature as possible. At a temperature of 30° C., for example, water vapor pressures of about 40 mbar and less are reached.

The waste heat inevitably arising in the work machines must be led away in the condenser to the surrounding area. The practical transfer of the waste heat in power plants or in large industrial plants, in which similar cooling requirements exist, but no direct cooling in the condenser by means of water from rivers, lakes or the sea is possible, is achieved preferably through natural draft cooling towers or through fan-type coolers with sucking or blowing fans.

The release of the condensation heat of the working fluid to the surrounding area usually takes place in several steps: First condensation of the steam on the outer surface of the condenser pipes, conduction of heat through the pipe material to the pipe interior, heat transfer through forced convection from the pipe interior to the cooling medium (usually cooling water) flowing through the pipes and finally thermal emission from the cooling medium to the surrounding area.

With operation of the power plant at high electrical output, a correspondingly large coolant flow is necessary, which has to be pumped through the condenser pipes. If, for example, a power plant has an electrical output of 1000 MWe, with a good power efficiency of 40%, a waste heat flow of 1500 MWth takes place as heat loss flow at low temperatures, which has to be transferred in the condenser from steam to the cooling medium and finally to the surrounding area. If the condenser is cooled with cooling water from a river, lake or the sea, the cooling water flow necessary therefor is about 36 metric tons/sec, if the cooling water must not be warmed up by more than 10 K. Since such large quantities of cooling water are often not available, the heat transfer from the cooling medium to the ambient air takes place in cooling towers.

In wet cooling towers, the heated cooling water originating from the process flows for the most part as film flow downwards from above on a wet surface towards an upward flowing air current. The air current is generated by fans or in high towers by natural chimney effect or by a combination of both. The heat transfer from the cooling medium to the upwards flowing air takes place for the most part through its evaporation in the air current, and since the evaporation heat of the cooling water is very large, the necessary water requirement from the surrounding area can be reduced by up to two orders of magnitude compared with the requirement with direct cooling from river, lake or the sea. Thus an air current loaded with water vapor flows upward out of the cooling tower.

However, the quantity of air that flows upwards through the cooling tower in order to convey away the waste heat of the plant to be cooled is also very large. In the above-mentioned example with the waste heat of 1500 MWth, the requirement in air is 20 to 30 metric tons/sec., depending upon prevailing meteorological conditions.

Another cooling concept consists in dry/wet hybrid cooling towers, which are used predominantly for elimination, or at least reduction, of the visible plume of humid air of the wet cooling towers. Here, too, the required quantity of air is very large, usually twice as large as the quantity of air of a wet cooling tower with an equal performance rating.

At sites where the quantity of water required for the evaporation cooling is not available, dry coolers are used. The quantity of air that is necessary for the convective heat transfer in such coolers is however about six times the requirement of the corresponding wet cooling towers.

The quantity of air is therefore an important parameter for the design and operation of all kinds of cooling towers, and is decisive for their physical size and costs, among other things with respect to the built-over area which such plants require. The conveying of the large air quantities is a challenging problem for the development of the towers. Several influences play a big role here, above all those of the meteorological constraints, which are closely linked to the functioning of the tower. Not only must the towers reliably absorb the thermal load in a wide range of meteorologically contingent temperatures and wind velocities and be able to release it into the atmosphere, they must also successfully fulfil this task in special situations such as heavy icing in winter or during storms.

With the conveying of the required quantity of air through the towers, a sufficiently high flue in the case of natural draft, and a correspondingly dimensioned large number of fans in the case of forced ventilation, must be operated, which are able to overcome the unavoidable flow pressure losses in the tower. The pressure losses are thus a further decisive parameter in the dimensioning of the towers, since they determine the required height of the towers with natural draft as well as the capacity of the fans when the tower or tower section is forced-air cooled.

STATE OF THE ART

Although the wet, dry and combined wet/dry operated cooling towers built so far fulfil by and large the striven-for energy-related goals, they are far from achieving the cooling efficiency that is achieved with direct cooling in which water from river, lake or the sea that flows directly through the power plant condensor is conducted back into the bodies of water directly.

If the operation of various cooling towers is namely compared with the method of direct cooling, a power plant that is operated with wet cooling tower with natural draft has, operating at the same power output, an approximately 3.2% lower degree of efficiency, and this even with the optimally rated wet cooling tower from among the different cooling tower types. This means that the primary energy consumption here is about 8% higher than with direct cooling. The loss of efficiency with the lower rated dry coolers with forced ventilation is even about 6.9%, so that their primary energy consumption is about 17% higher than with direct cooling.

Aside from the protection of valuable bodies of water, being called for in many places, the facilities equipped with air cooling are at a disadvantage owing to the higher investment costs, the size of these structures and the corresponding optical intrusion in the landscape.

To improve the cooling efficiency of the air-cooled towers constructed so far, heat and material-exchange surfaces (fills in the cooling towers) with high volume-specific surfaces have been provided. These fills however have proven to be highly prone to soiling in many cases. Through the soiling the fills basically lose their cooling efficiency, in many cases even very quickly, and reduce in this way the improvement that they are actually supposed to provide. Thus these measures for improvement of the degree of efficiency of the plant are subject to narrow confines.

The cooling efficiency is not only dependent upon the size of the fills and of the exchange surfaces, however, but can also be enhanced by an increase in the quantity of air.

The aerodynamics of the air supply from outside the cooling tower can thus have a considerable influence on the overall cooling efficiency.

In the German patent specification DE1501396, for example, an annular flange on the upper edge of the air inlet opening has been described, which is supposed to promote the inflow of the air in the cooling tower by conducting the downward flowing air outward in order to achieve a desired flow line. A considerable portion of the needed air is pulled down along the cooling tower outer wall, and this air current must be diverted by 180°, preferably without causing the so-called pinch-in effect.

The annular flange of DE1501396 has the drawback that it has to be adapted precisely to the dimensions of a particular cooling tower, and has to be designed and built already during the construction of the cooling tower. A further disadvantage of the annular flange of DE1501396 is that the desired air current is dependent on the formation of a "dead zone" of stagnant air below the flange. Transverse-flowing air (wind) can disturb such stagnant zones or respectively prevent their formation. The annular flange can also be affected very easily by ice impact or respectively snow load. Such impacts or respectively loads (from ice or snow, for example) are also directly transmitted to the lower edge of the shell. This lower region of the shell is precisely where the entire weight of the shell (e.g. 20 000 metric tons or more) is distributed over many supports. Therefore this region of the shell is one of those areas where the structural engineering is the most critical, and where the statics should not be impaired by indeterminate forces or other interference. The point here is not necessarily that the structure could be compromised, but rather that the inspected statics approved by the authorities should not be changed in such a way that a further inspection or respectively another permit becomes necessary.

The air supply in the cooling tower can also be greatly interfered with by rain in the rain zone. It is known from the British patent GB374077 to increase the quantity of air that can flow through a wet cooling tower by the cooling water in the lower wet zone being allowed to converge as larger drops. A further solution is found in the German patent specification DE1059941, in which the cooling water is collected over the entire lower wet zone and is carried away by channels. Both systems have, however, big installations involving large amounts of time and effort and high costs.

It is thus the object of the present invention to provide an air introduction system and method for cooling towers that overcomes, among other things, the above-mentioned drawbacks of the state of the art.

In particular the invention provides for a system for aerodynamic supply of cooling air from the surrounding area of a cooling tower through an air inflow opening in the interior of the cooling tower, which cooling tower has a tower shell, the system having a multiplicity of aerodynamic modules, which are detachably mountable on at least one edge of the air inflow opening of the cooling tower, each of the multiplicity of aerodynamic modules having a diversion surface that is designed such that it diverts around the said edge the air flowing into the cooling tower.

According to a variant of the invention, the cooling tower has inside a heat exchange system with a rain zone and an air intake zone, through which air intake zone the air is drawn into the rain zone, the system having at least one rain collection element which is able to be disposed in the rain zone in such a way that, during the operation of the heat exchange system, the rain collection element collects and conveys away at least a portion of the rain drops in the air intake zone.

Furthermore the invention provides a method of improving the aerodynamic supply of cooling air from the surrounding area of a cooling tower through an air inflow opening into the interior of the cooling tower, which cooling tower has a tower shell, the method having an installation step in which a multiplicity of aerodynamic modules are mounted on at least one edge of the air inflow opening of the cooling tower, each of the multiplicity of aerodynamic modules having a deflection surface which is designed in such a way that, with use of the aerodynamic module, it diverts around the said edge the air flowing into the cooling tower.

According to a variant of the method according to the invention, the cooling tower has inside a heat exchange system with a rain zone and an air intake zone, through which air intake zone the air is drawn in, and the method comprises a second step in which at least one rain collection element is disposed in the rain zone in such a way that during the operation of the heat exchange system the rain collection element collects and conveys away at least a portion of the rain drops in the air intake zone.

According to a variant of the method according to the invention, the said installation step has a first stage in which a multiplicity of attachment elements are fixed to the outside of the tower shell, and a second stage in which the aerodynamic modules are mounted on the attachment elements.

According to another variant of the invention, each of the multiplicity of aerodynamic modules is designed as hollow body.

According to another variant of the invention, the hollow bodies form or have at least one conduit for passage of lines, pipes or cables.

According to a further variant of the invention, the hollow bodies have water passages and/or drainage openings.

According to another variant of the invention, each of the multiplicity of aerodynamic modules has a deflection surface and a diversion surface, the deflection surface is designed in such a way that, with use of each said aerodynamic module on the lower edge of the tower shell, it pushes the air flowing downward along the tower shell radially outward by a deflection distance, and the diversion surface is designed in such a way that, with said use, it conducts the air pushed outward from the deflection surface along a diversion curvature into the air inflow opening.

According to a further variant of the invention, the said deflection surface is designed in such a way that objects falling down along the outer surface of the tower shell are able to be substantially led over smoothly to the deflection surface without discontinuity and be pushed outward by a deflection distance.

According to another variant of the invention, the aerodynamic modules are designed in such a way and are attachable to one another in such a way that the hollow bodies of the aerodynamic modules form a passageway able to be walked through by a human being.

According to a further variant of the invention, the aerodynamic modules are disposed side by side in a configuration in such a way that the configuration has a multiplicity of interim gaps between the aerodynamic modules.

According to another variant of the invention, a lower edge of the air inflow opening is provided with an aerodynamic diversion ramp, which diversion ramp diverts the inflowing cooling air about the lower edge of the air inflow opening.

The invention also aims to provide an aerodynamic module that is designed in such a way that it is detachably mountable on at least one edge of the air inflow opening of a cooling tower, the aerodynamic module having at least one diversion surface, which is designed in such a way that, with use of the aerodynamic module, it diverts around the said edge the air flowing into the cooling tower.

According to a further variant of the aerodynamic module according to the invention, the aerodynamic module has a lateral flange for stiffening of the aerodynamic module, the lateral flange protruding out of the outer surface of the aerodynamic module, and the protruding lateral flange forming in a way substantially radial to the cooling tower an air conducting surface, with use of the aerodynamic module.

The air introduction system as well as the corresponding method will be explained more closely in the following, by way of example, with reference to the enclosed drawings:

FIGS. 3A and 3B show in diagrammatic views the same air inflow region of a cooling tower, without air introduction measures and with air introduction measures.

FIGS. 4A to 4D show in schematic view how the overall air current can be improved through the formation of smaller, local vortices.

The appended drawings are merely provided as illustrative examples which are supposed to serve the purpose of better comprehension of the invention. They do not represent any limitation of the claimed invention. In these drawings same reference signs are used for identical elements or elements functioning in a similar way.

DETAILED DESCRIPTION OF THE INVENTION

Figure 1:
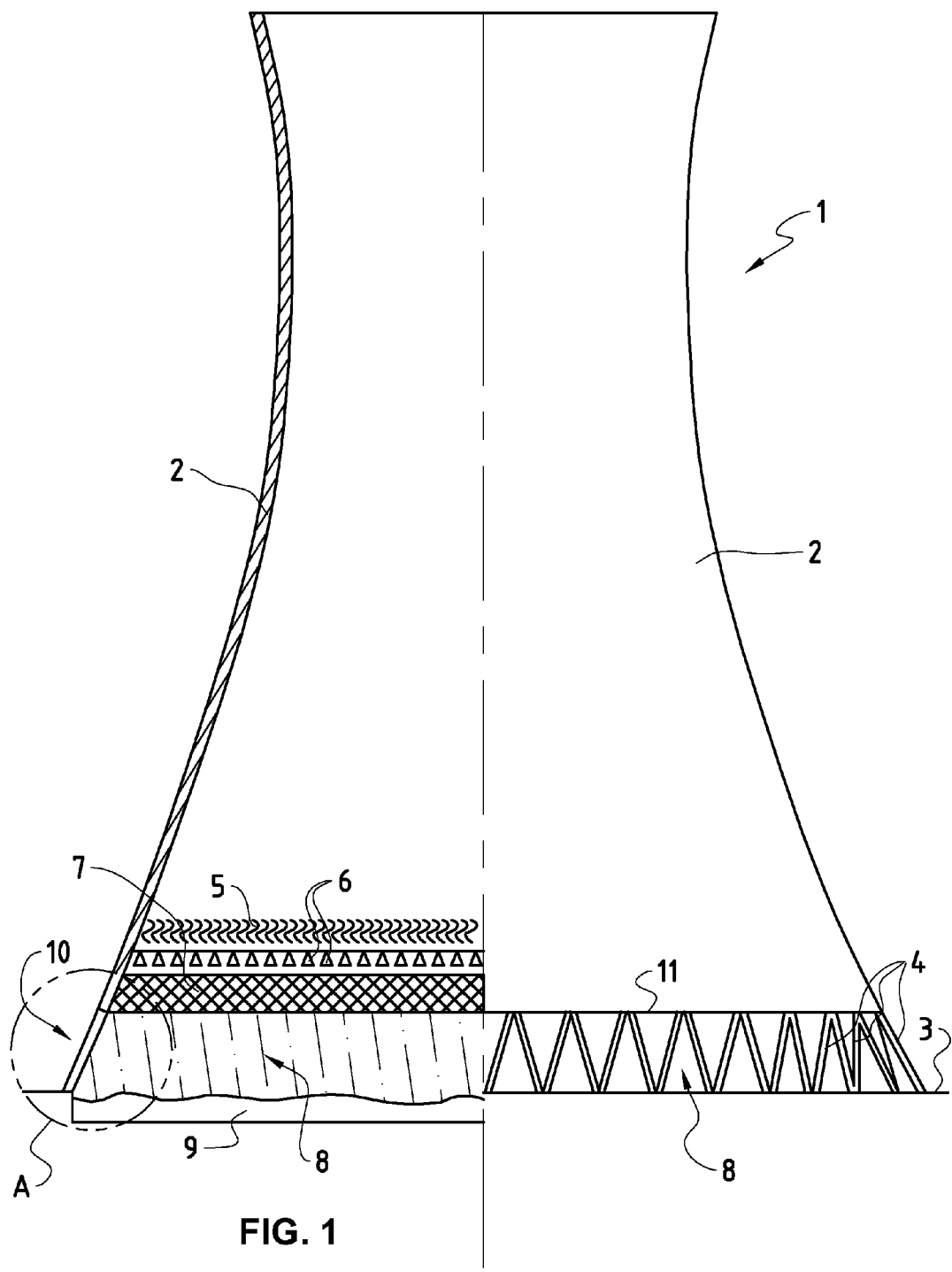
FIG. 1 shows in a lateral view, partially in cross section, a typical wet natural draft cooling tower.

FIG. 1 shows as example a conventional wet cooling tower 1 with natural draft. Such a tower has a cooling tower shell 2 (also called shell or flue element), which is borne on the underlying support surface 3 by means of a set of supports 4. Air from the surrounding area of the tower is drawn in through the air inflow opening 10 (between the supports and between shell 2 and support surface 3). The air flows under through the air inflow opening 10 into the so-called rain zone 8 of the tower 1, where it is subsequently distributed. Coming out of the rain zone 8, the air rises up through the heat exchanger surfaces (the so-called fill 7), in counterflow to the downward flowing hot water from the condenser. The air then flows through the spray zone, in which the hot water is sprayed as evenly as possible on the fill 7 by thousands of firmly built-in spraying units 6. Droplet separators 5 finally free the rising air of small spray droplets, which arise through this spraying, before the air flows into the actual flue.

These individual components of the tower 1 cause different air pressure losses. The lighter air in the flue, characterized by higher temperature and humidity than the ambient air, generates the draft required to overcome these pressure losses. The chimney effect is proportional to height (120 m to 180 m are typical) of the empty space within the cooling tower shell 2.

Figure 2:
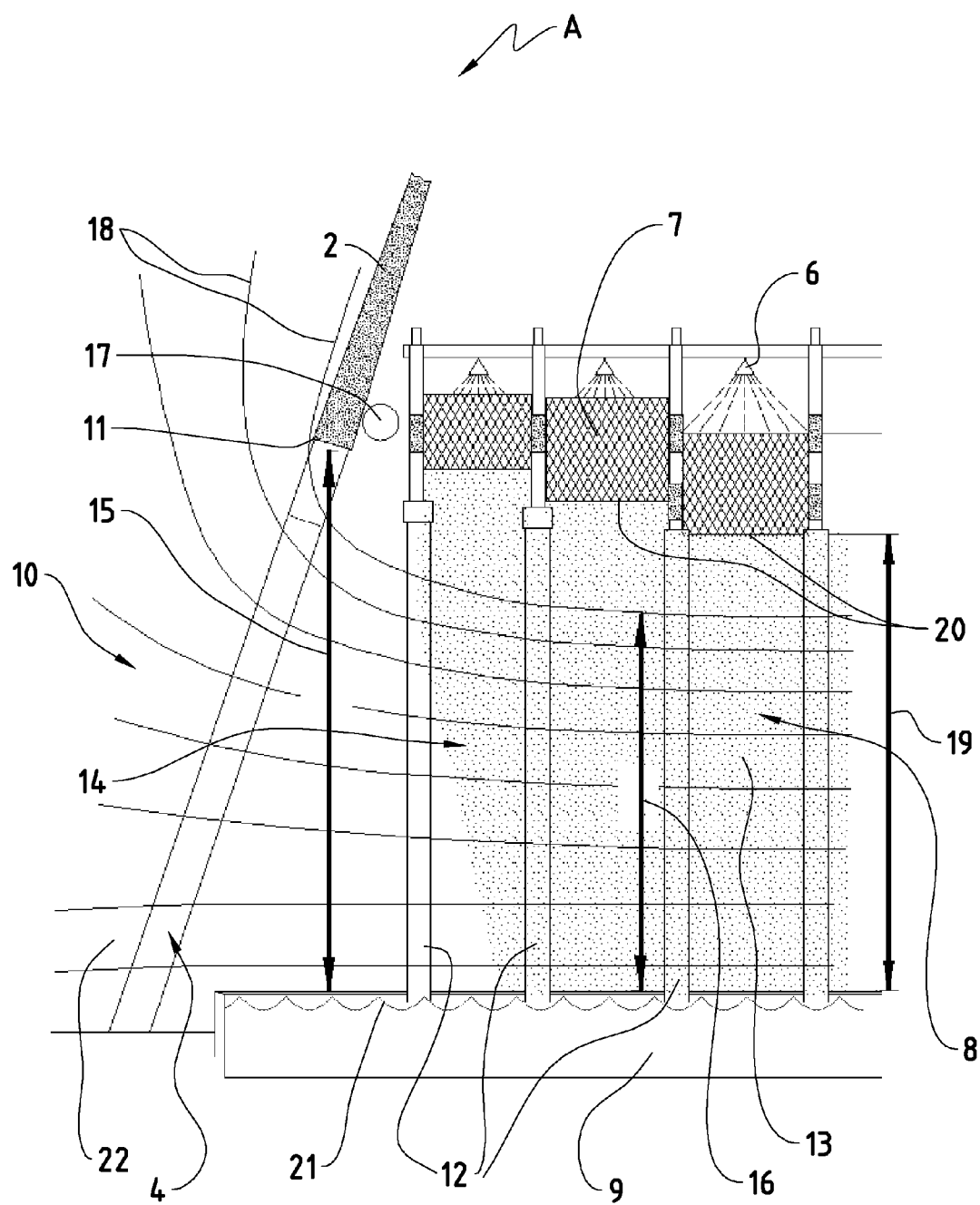
FIG. 2 shows in a diagrammatic view the aerodynamics of the air inflow in a section A from FIG. 1.

As guidance, FIG. 2 shows diagrammatically the approximate flow pattern of the air with a commonly used conventional natural draft cooling tower. One notices in FIG. 2 the dense dotting of the intense curtain of rain 13, whose front 14 is inclined by up to e.g. 30° owing to the interplay with the air streaming in. The dense dotting is supposed to indicate that the structure of the curtain of rain cannot contribute to any flow-specific and energy-favorable mode of operation of the cooling tower owing to the thereby linked high flow resistance of the rain with respect to the air flowing in.

FIG. 2 shows an example of an air inflow opening 10 of the known cooling tower 1 from FIG. 1. The air inflow opening 10 is formed from the interim spaces between the underlying surface (in this example the surface 21 of the water in the water pool 9), the lower edge 11 of the shell 2, as well as the shell supports 4, which bear the weight of the shell 2. The height of the air inflow opening is designated by 15.

Disposed in the interior of the cooling tower are fill elements 7 (heat exchange elements). These are sprayed with water from above by means of spraying facilities, which water subsequently falls as curtain of rain 13 into the water pool 9. The fills 7, spraying facilities, etc., are supported on a bearing structure consisting e.g. of a multiplicity of supports 12. A winter pipe 17 around the periphery of the installation section can be provided to protect the tower against icing at low temperatures by generating a hot water curtain through slits in the winter pipe 17.

FIG. 2 shows how the air current, which has at the air inflow opening 10 a maximum height 15, is subsequently greatly confined to a constricted height 16, the air current ideally distributing itself as evenly as possible over the entire available height 19 (the space between the lower surface 20 of the corresponding fill elements 7 and the upper surface 21 of the water in the water pool 9).

To improve the cooling efficiency of such conventional cooling towers, one can aim at a reduction of the interplay between air and rain 13 in the rain zone 8. This can take place, for example, through a reduction of the drag factor of the rain 13, and/or through the generation and maintenance of an as homogenerous as possible, smoothed flow distribution of the air on the boundary surface, at which the air meets the curtain of rain 13 in the rain zone 8.

FIG. 3B and following show how the efficiency of the air flow (and therefore the cooling) can be improved in such a way.

In particular in the periphery region of the tower (air inflow opening 10) as complete as possible a use of the effectively existing through-flow height 15 of the tower in its rain zone 8 can be achieved through elimination or reduction of the constriction of the flow height 16.

As explained in the following, it is possible to divert the air 18 streaming into the cooling tower from the vertical direction along the shell 2 as early as possible and with little loss in the horizontal direction to the extent that it flows as evenly as possible across the available height of the opening 19, between lower edge 20 of the fills 7 and the water surface 21 of the pool 9.

It is likewise possible to design the flow of the air into the curtain of rain 13 in such as way that as even as possible a flow speed distribution over the entire available height 19 is achieved without loss-increasing peaks.

As explained in the following, it is also possible to reduce the intensity of rainfall, the rain 13 being e.g. collected through suitable means and being transfigured into streaks or the droplet size being enlarged in order to reduce the flow resistance of the air through the rain 13.

In a similar way, the air can also be directed in the lower region 22 of the air inflow opening 10 in such a way that it flows around the impediments (e.g. supports 4 or pool rim 23) in the periphery region of the rain zone 8 with little loss.

The aerodynamics of the air inflow opening 10 can also be designed in such a way that the air is able to flow around the supports 4 of the cooling tower shell 2 and supports 12 of the fills 7 over the entire open height 15 at the air inlet with as few as possible losses, displacements and constrictions.

FIG. 3A shows again in a simplified form the disposition of the various elements forming the air inflow opening 10 of the known cooling tower of FIG. 1 and FIG. 2. The shell 2 is borne on supports 4, and has a lower border (edge) 11. Rain 13 falls from fills 7 into the water pool 9. The wall of the water pool 9 has an upper border (edge) 23, which also forms an impediment against the inflow of the air.

FIG. 3B shows various measures that promote air inflow and/or reduce the resistance against the inflow. In the example depicted, aerodynamic modules 25, 24 are disposed on the exterior of the shell 2 or respectively on the ground in order to divert evenly the air flowing in about the respective edge (lower edge 11 of the shell 2, or respectively upper edge 23 of the pool wall). Furthermore rain collection elements 30 are placed under the fills 7. A low-rainfall region 29 thereby arises by means of which the air streaming in is able to flow unimpeded into the interior of the tower and into the rain 13. The rain collection elements 30 are constructed in such a way that the cooling air is able to flow upward through or respectively between the rain collection elements 30. Through the combination of the unconstricted air inflow (thanks to the aerodynamic modules 24, 25) on the one hand, with the low-rainfall, air-permeable region 29 (thanks to the rain collection elements 30) on the other hand, an interaction of the two measures develops which leads to an even higher air inflow than the sum of the air inflow improvements that are achieved through the individual measures.

The form of the aerodynamic modules 25 that are installed on the exterior of the shell 2 can also be seen in FIG. 3B. In this example the aerodynamic modules 25 are composed in each case of an approximately airfoil-shaped air conduction profile having substantially two guiding surfaces 26, 28. The upper guiding surface 28, also called deflection surface, serves the purpose of pushing outward the air flowing down along the shell surface. This outwardly pushed air is then redirected by the lower guiding surface 26, also called diversion surface, by a curvature so that the air flowing into the interior is smoothly diverted as much as possible without constriction about the edge 11 of the shell 2.

The lower border (edge 23 of the water pool) of the air inflow opening 10 can also be provided with one or more aerodynamic modules 24. In this example, an aerodynamic module 24 is shown which is constructed as a ramp. The air flowing in is thereby led smoothly over the wall of the water pool 9 (edge 23), and the constriction which otherwise arises owing to the abrupt pool edge 23 can be reduced in this way.

The effect of these various measures as well as the special interaction of the combination of measures will be explained more closely below.

The air inflow resistance of the rain in the cooling tower is approximately proportional to the rain density and with constant rain density inversely proportional to the average diameter of the droplets. Larger droplets offer on the whole a smaller contact surface for the air in that they are fewer in number at the same rain density. Therefore a possibility exists herein of reducing the air resistance and of influencing the dripping at the position 41 below the fills 7 in such a way that larger droplets arise. Through defined drip points and through their shape the formation of larger drops is thereby promoted (a sawtooth-shaped termination in the exchange surface of the fills 7 is indicated in FIG. 3b as well as in FIGS. 5 and 6b).

Figure 7A:
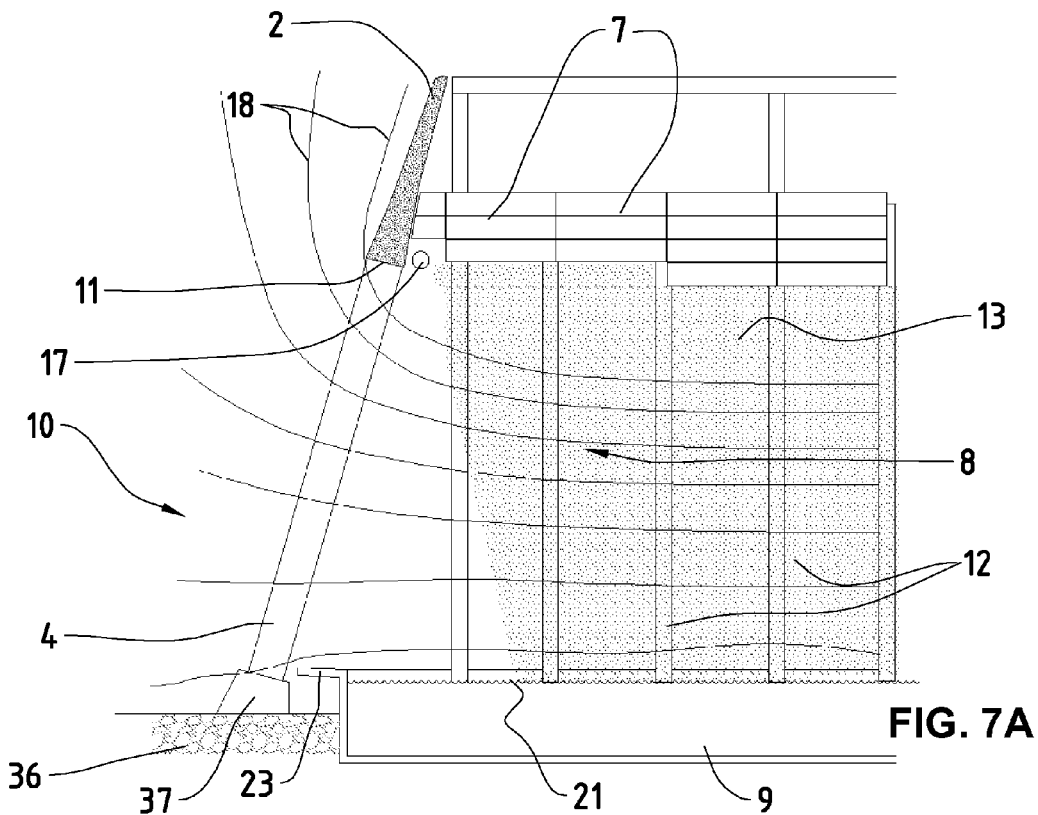
FIGS. 7A and 7B show in a schematic cross section the aerodynamics of an air inflow region, without air introduction measures and with air introduction measures, as embodiment example of an air introduction system according to the invention.
Figure 7B:
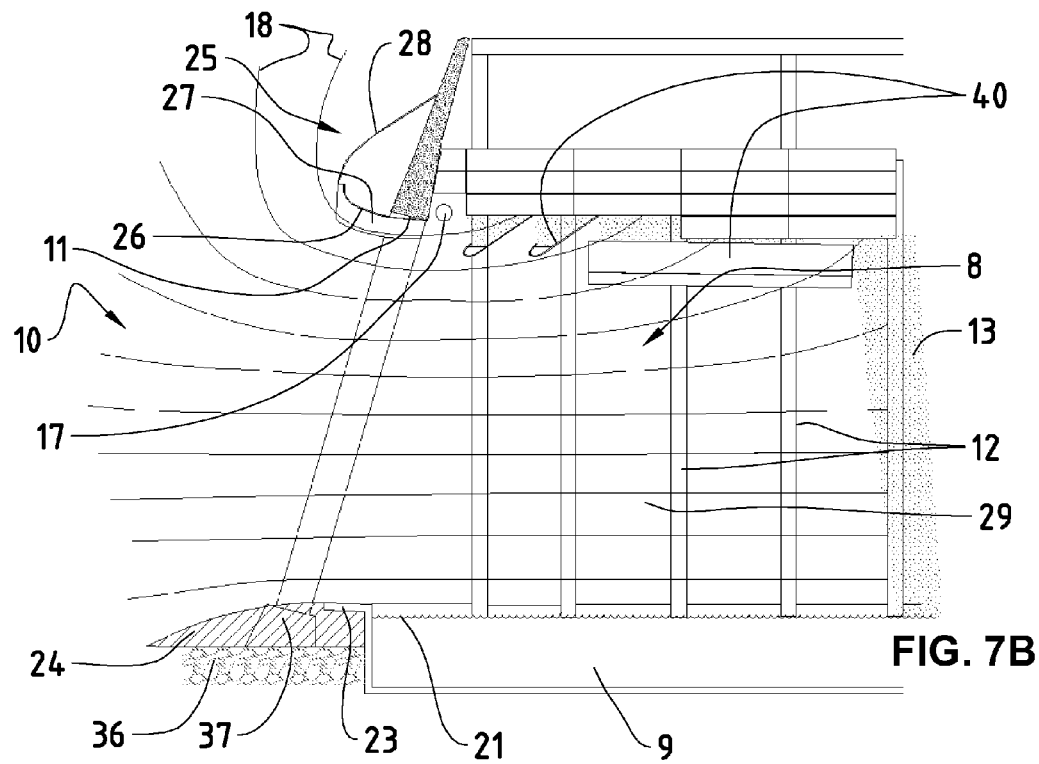

Alternatively to the drip elements, collection troughs 40 can be hung up in order to generate streaks of water which likewise provide lower resistance against the air current (this is also indicated in FIG. 7B). Collection surfaces positioned obliquely, which deliver the water into the troughs as outlined in FIG. 5, offer a certain simplification of the system in the cases where a sufficiently free height is available. The troughs 40 and surfaces can be aligned in such a way that they act at the same time as diversion aid for the inflowing air and therefore for conversion of the dynamic portion of the air current into workable static pressure differences, and can further improve the pressure conditions. Further configurations and variants are possible which fulfil the basic function, namely of reducing the interplay between air and rain. Thus, among other things, the collected water from the troughs can be allowed to flow away via pipes in a controlled way.

Attention must be paid to the fact, however, that the direct heat exchange in the rain zone is also influenced by the measures described above for reduction of the flow resistance brought about by the rain.

The cooling efficiency, i.e. the thermal flow during the heat exchange between rain and air in the rain zone, usually lies below 10% of the cooling efficiency between water in the installation region of the tower and rising air. With larger towers, this cooling efficiency brings about an additional reduction of the cold water temperature in the periphery region of the curtain of rain. The radially flowing air thereby heats up in a corresponding way, however, whereby it can absorb less heat. The central part of the tower, which is supplied with preloaded air, thus looses cooling efficiency.

Measurements and model calculations show that the cooled water seen as a whole tends to take on higher temperatures. A suppression of the heat exchange in the periphery region is thus permissible without further ado and advantageous from thermodynamic point of view, in particular when the above-described rain collection elements are implemented, preferably in the periphery region only.

By the time the air penetrates into the central region of the rain zone, the air velocities have become so low that the resistance of the rain there leads to no great pressure losses. For this reason rain collection elements can be omitted in the inner rain zone, with the consequence that the rain collection system can be constructed in a considerably simpler and more cost-efficient way.

Since the rain collection elements are installed only in the periphery region of the rain zone, and since the water pool is anyway preferably maintained, the rain collection elements can be installed as backfit system without the entire rain and water circulation system having to be revised. Furthermore, since the water pool can be retained, leakages in the collection system are not critical and can be tolerated.

Since it thus suffices to eliminate the interaction air/water in the rain zone in its peripheral region (i.e. within a distance of about ⅙ to ¼ of the tower radius, counted from outside) in order to achieve a noticeable reduction of the pressure losses, these measures can be achieved without thermodynamic disadvantages.

The profiled elements (aerodynamic modules) 25 should divert as much as possible the vertical portion 18 (cf. FIG. 2) of the stream of air in the periphery region to the extent that the air can flow down over the whole height of the opening 19, in a largely horizontal, uniform way and as much as possible free of peaks, with minimal loss upon arrival in the opening of the structure. The geometric dimensions of the profiled elements 25 can be of compact design; however, through sufficient size, they can be designed in such a way that an equalization of flow ensures heat exchange over the entire height of the rain zone. The profiled elements 25 should be provided preferably outside the inner surface of the cooling tower shell in order not to interfere with the operation of the inner cooling tower devices, such as e.g. any existing winter ring pipe 17, which, during frost, generates a hot water curtain as antifreeze protection.

The aerodynamic module 25 depicted in FIG. 3B is provided with a diversion profiled element 26, which is composed of a multiplicity of individual diversion surfaces. The configuration of the individual diversion surfaces 26, and the discontinuities lying in between (steps 33) are now described with reference to FIGS. 4A to 4D.

FIGS. 4A and 4B show the air flow around a substantially continuous diversion surface. If the curvature of the diversion surface is less than a certain radius (dependent upon the air flow speed), small whirls flattened against the diversion surface 26 can arise (also called vortices), which can impede the air flow on the macro level, and which do not promote the desired diversion of the air stream.

It is however possible to allow such whirls to arise intentionally, or to create such whirls, so that the streams of air flowing past are diverted along the diversion surface in a more powerful way. Such a variant is depicted, for example, in FIGS. 4C and 4D. The diversion surfaces can be provided with one or more discontinuities (steps) 33, so that in each step a whirl 32 is formed. Such whirls function in a similar way as the above-described "stagnant air", but are much smaller, however; they are shielded at least partially from the crosswind by the steps 33, and are not affected by external gusts, etc.

The desired diversion curvature of the lower diversion surface 26 therefore does not necessarily have to be shaped as a continuous curve. It can be composed in an advantageous way of a multiplicity of flat surfaces which are situated with respect to one another at a certain angle.

Figure 5:
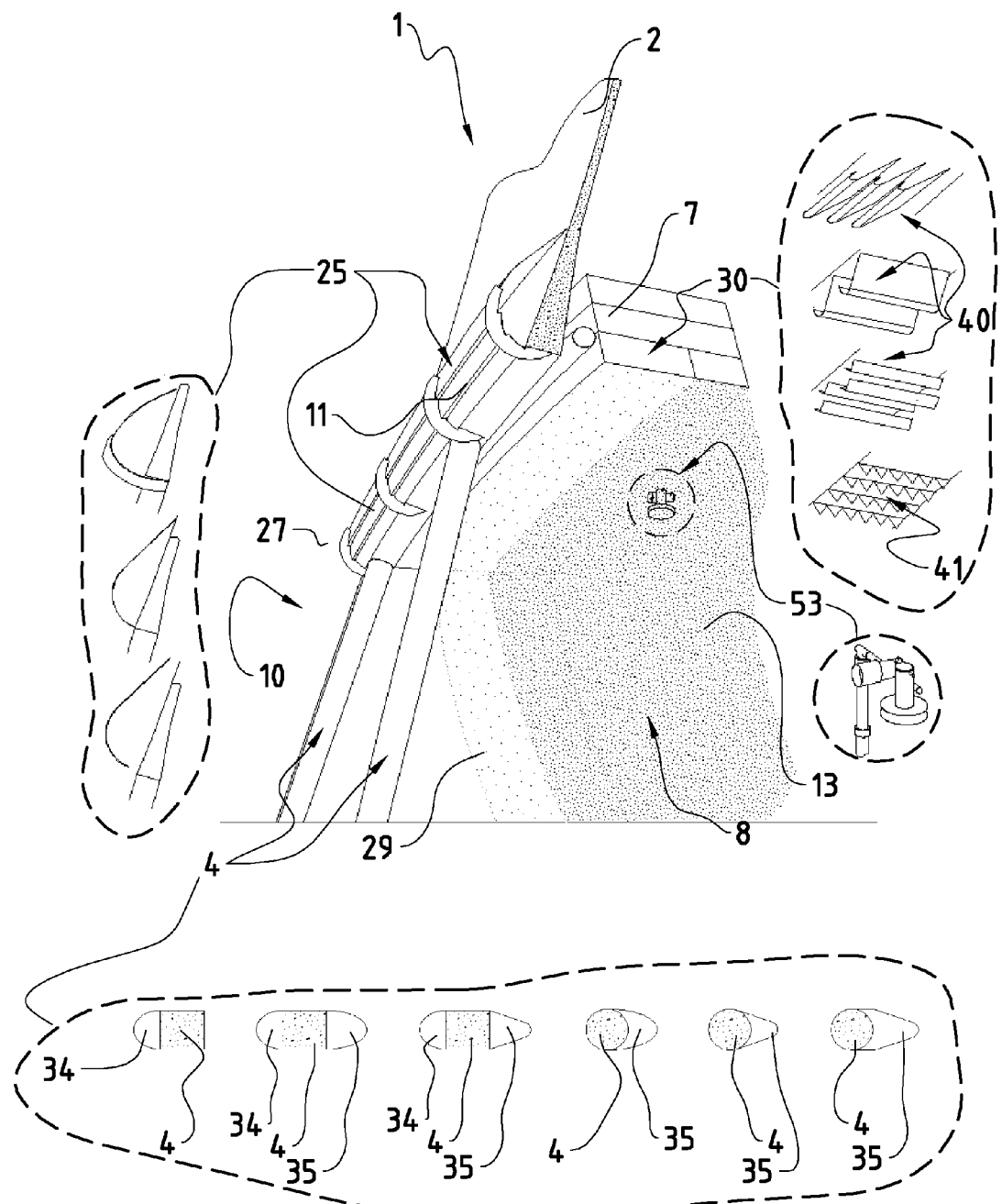
FIG. 5 shows in schematic, perspective view an embodiment example of an air introduction system according to the invention.

FIG. 5 shows a configuration of aerodynamic modules 25 on the lower edge 11 of a tower shell 2. In this illustrated example, the aerodynamic modules (three are visible in FIG. 5) are mounted next to one another on the outer surface and on the edge 11 of the shell 2. The weight of the shell is borne on supports 4. Air from the surrounding area of the cooling tower flows through the air inflow opening 10 into the rain zone 8. The rain zone 8 has a low-rainfall region 29, thanks to the rain collection elements 30 (indicated only symbolically in FIG. 5), and a region 13, where the rain still comes down as a full stream from the fills 7. The inflowing air flows in an unconstricted and unimpeded way through the low-rainfall region 29 into the inner rain region 13, where it is drawn upward. The inflowing air also flows in a substantially unimpeded way through the rain collection elements 30 upward. The air velocity of the inflowing air is approximately in relation to the square root of the resistance, which arises in the air stream. If two or more resistance factors (for instance constriction of the airflow through poor aerodynamics, plus rain in the rain zone) are in series, they will impede the flow cumulatively, with the consequence that a reduction of two or more of the resistance factors in series has a considerably greater effect than the sum of the individual effects would have been if the resistance factors were reduced individually. Therefore the combination of the improvement measures (aerodynamic modules and rain collection elements) together have an effect which is considerably greater than the sum of the individual measures.

Each of the aerodynamic modules 25 can be mounted, for example, separately on the outer surface of the shell. This modular mode of construction has the advantage that each aerodynamic module 25 can be relatively easily lifted and handled. Thus the aerodynamic modules 25 can also be easily dismantled or replaced. With a cooling tower shell of 120 m diameter, the lower circumference of the shell could be provided with between 3 and 500 separately mountable aerodynamic modules, for example. Preferably the dimensions of the aerodynamic modules are selected proportionally in such a way (e.g. between ¹⁄₂₀ and ¹⁄₃₀₀ of the circumference of the shell) that the entire configuration of aerodynamic modules can be easily and quickly mounted. The design of the aerodynamic modules 25 will be described in the following.

As also shown FIG. 5, the aerodynamic modules 25 can have lateral flanges 27, which can serve the purpose, for example, of connection of the adjacent aerodynamic modules 25, and/or form additional conducting surfaces in order to conduct the inflowing air in the vicinity of the aerodynamic modules 25 in a radial direction (the direction radially outward from the central axis of the cooling tower).

FIG. 5 also shows some examples of how the cross-sectional form of the aerodynamic modules 25 can be designed. The uppermost of the three shape examples is provided with a lower conducting flange. The lowermost of the three shapes is mounted with a small spacing on the shell surface. This spacing can also serve as water passage.

FIG. 5 also shows different possible variants of the rain collection elements 30. A multiplicity of U- or V-shaped troughs 40, for example, can be mounted in the rain zone, or a multiplicity of drip elements 41. Inclined collection surfaces (uppermost illustration) can also be mounted in such a way that the collected rain runs into the troughs 40, from where it is conducted away.

Furthermore FIG. 5 shows in cross section a series of examples of how the aeordynamics of the shell supports 4 can be improved. Aerodynamic profiled elements 34 or respectively 35 are installed on the front or respectively rear side of the respective shell support so that here, too, less constriction occurs through the air flowing around the shell supports.

It is also indicated in FIG. 5 how rain-zone-suitable instruments such as a rain zone pitot 53 for measurement of the air velocity and of the static pressure in the intensive rain can be used. The sensor heads of these instruments are designed in such a way that they are able to separate the measurement activity from the rain from the raindrop impact according to shape and size, and capture the values of the air parameters (e.g. static pressure and impact pressure) in a way undisturbed by the rain.

Figure 6A:
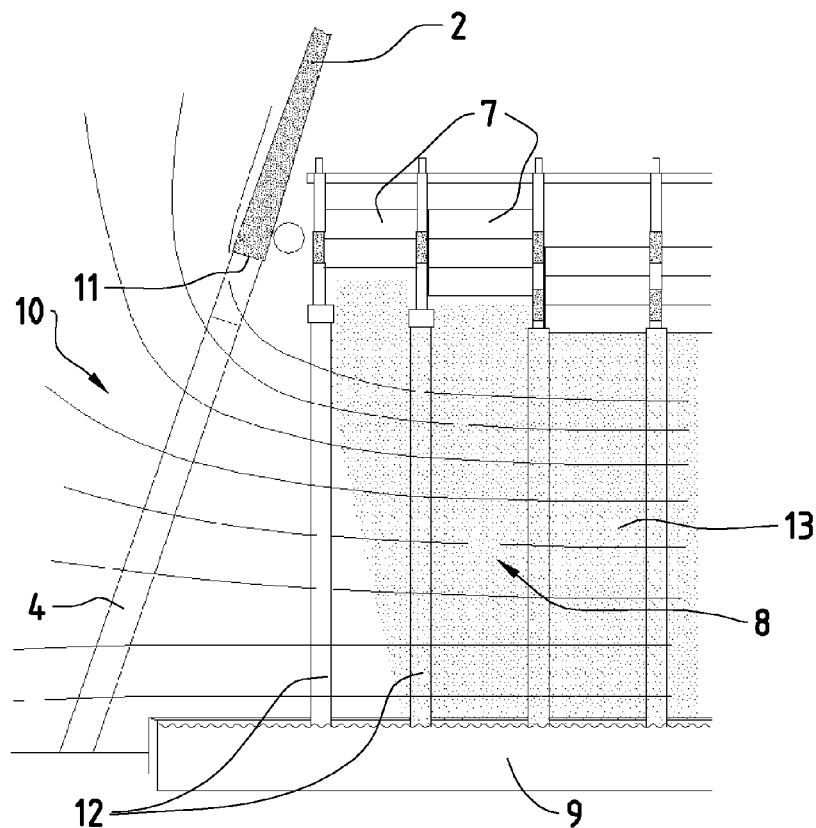
FIGS. 6A and 6B show in diagrammatic cross section the aerodynamics of an air inflow region, without air introduction measures and with air introduction measures, as embodiment example of an air introduction system according to the invention.
Figure 6B:
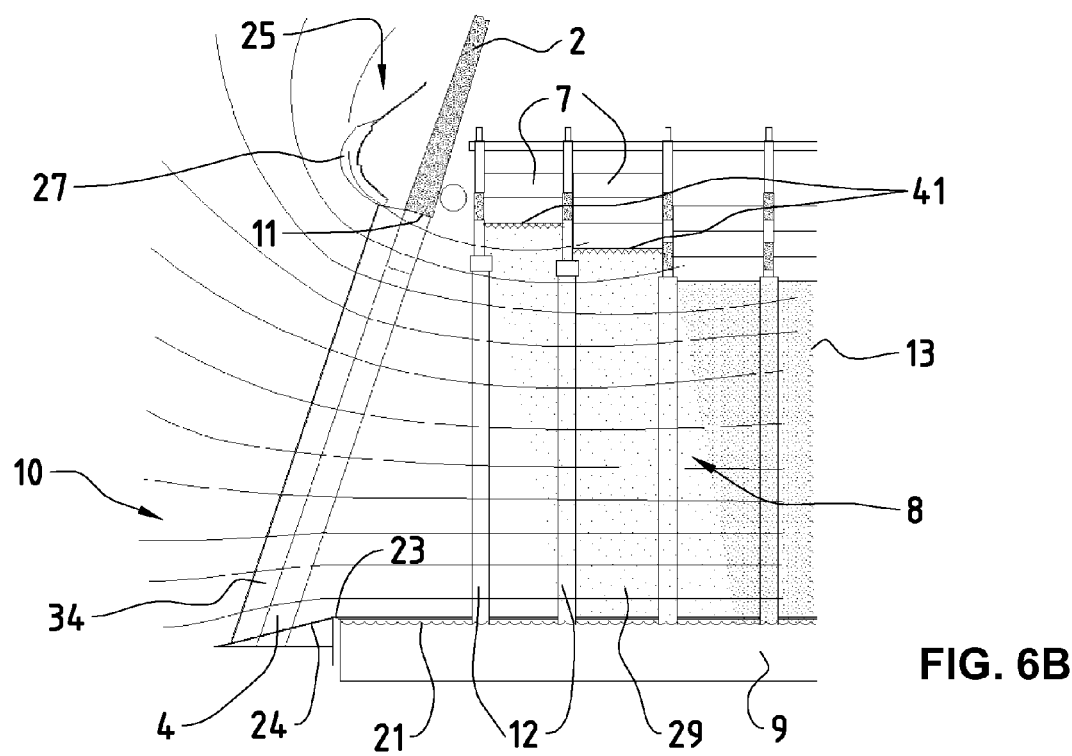

FIG. 6A shows once again the air inflow with a cooling tower without aerodynamic improvement measures. FIG. 6B shows as an example of how this air inflow can be improved by applying one or more of the measures shown. In this example, aerodynamic modules 25 are mounted on the shell 2, a diversion ramp 24 on the floor, rain collection elements 40 in the rain zone 8 and aerodynamic profiled elements 34 on the shell supports 4. In this example the rain collection elements are designed as drip elements 41, whereby these could also be replaced by troughs 40, and, if necessary, also enhanced with rain collection surfaces. The diversion ramp 24 in FIG. 6B is designed as flat ramp, but could have a different shape, such as, for example, the diversion ramp in FIG. 7B.

For reduction of the air pressure losses at the place where the stream of air hits the rain 13, the rain density in the periphery is reduced by adapting the spraying, and drip element 41 is used to stop the formation of small drops and instead to promote the formation of large drops. In the embodiment shown, the dripping locations and the drop size are predetermined approximately by the geometry of the saw-shaped terminations. The drip element can be suspended, for example, on the same structure as the fill 7 using rustproof cables or rods.

FIG. 7A shows once again the flow of air with a cooling tower without aerodynamic improvement measures. FIG. 7B shows as further example how this flow of air can be improved through application of one or more of the depicted measures. In this example, aerodynamic modules 25 are again mounted on the shell 2, a diversion ramp 24 on the floor, and rain collection elements 40 in the rain zone 8. In this example the rain collection elements are designed as troughs 40, whereby these can also be enhanced, if necessary, with rain collection surfaces. The diversion ramp 24 in FIG. 7B can be constructed of solid concrete, asphalt or the like around the feet 37 of the shell supports. The diversion ramp is preferably insulated mechanically from the wall of the water pool 9 so that, with differing thermal expansion coefficients, no undesired mechanical stresses arise between ramp 24 and water pool.

The aerodynamic modules 25 can be engineered as solid bodies, preferably made of a lightweight, weatherproof material such as styrofoam, so that the entire weight of the aerodynamic modules 25 around the circumference of the cooling tower does not interfere with the statics of the shell.

Figure 8:
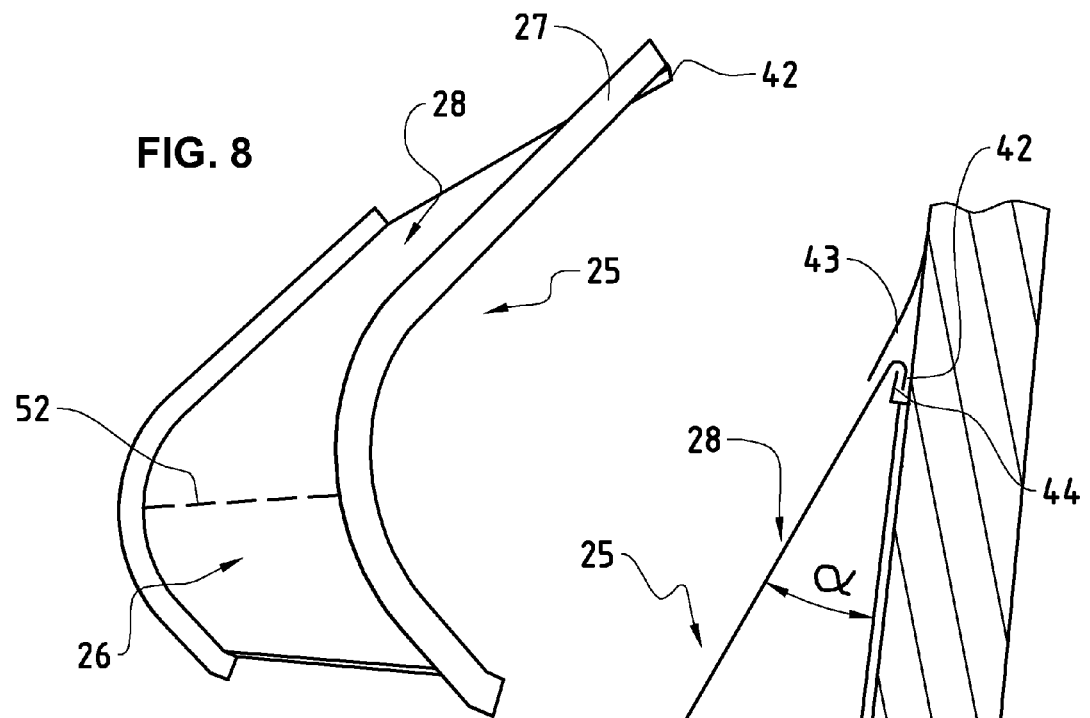
FIG. 8 shows in perspective view an aerodynamic module according to an embodiment of the invention.

The aerodynamic modules can be engineered preferably as hollow or profiled elements. FIG. 8 shows as embodiment example how an aerodynamic module 25 can be construced e.g. from sheet metal. Of course the aerodynamic module 25 can also be made of other suitable materials, such as, for example, glass fiber reinforced plastic (GFRP) or carbon fiber reinforced plastic.

The aerodynamic modules 25 can be typically about 3 m high, and for example 2m wide. The hollow space between the aerodynamic module 25 and the shell 2 can be designed in such a way that it is able to be walked through by human beings. If the cooling tower with adjacently mounted aerodynamic modules 25 is remodeled, the hollow spaces put together form a tunnel able to be walked through. Thus a close inspection of the aerodynamic modules from inside and/or of the shell 2 from outside is made possible.

In the example of FIG. 8, the deflection surface 28 and the diversion surface 26 run together in a continuous way without discontinuity, and form a support-shaped section. The diversion surface can also be provided with steps 33, however, as described above.

The aerodynamic module depicted in FIG. 8 has two lateral flanges 27. Such flanges can reinforce the stiffness of the aerodynamic module. They can also serve as air current conduction flanges to guide the air flowing around the aerodynamic module 25 radially to the central axis of the cooling tower. The flanges 27 can also serve the purpose of connecting together adjacently mounted aerodynamic modules 25 by adjacent flanges being connected together. It is however advantageous to leave a gap 48 (see FIG. 10) between adjacently placed aerodynamic modules 25, whereby sufficient space remains for thermal expansion or contraction so that no thermal mechanical stresses are conducted into the basic structure of the shell 2.

The aerodynamic module 25 of FIG. 8 has, by way of example, an attachment lip 42. The function of this lip 42 is explained more closely in FIG. 9. In this example, the aerodynamic module 25 is attached to an attachment element 44,45,47, which is itself attached to the shell. To facilitate the mounting of the lightweight aerodynamic module 25, the attachment element is provided with a second lip 44, to which the attachment lip 42 of the aerodynamic module 25 can be attached. Thus each aerodynamic module 25 can be hung preliminarily before it is screwed, for example, or otherwise fixed on the lower attachment part 47.

Figure 9:
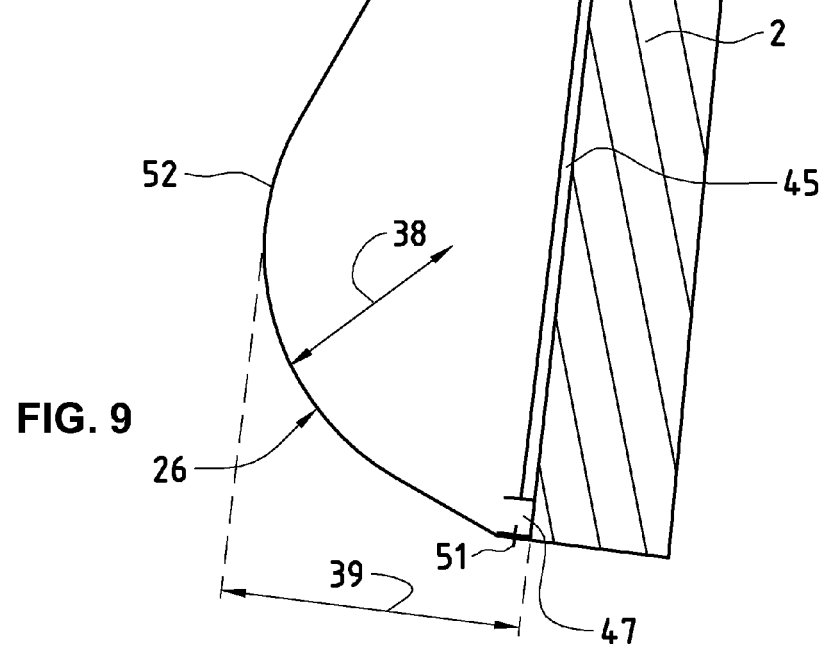
FIG. 9 shows in cross section how an aerodynamic module, depicted in FIG. 8, can be mounted.

FIG. 9 shows in a simplified, schematic view, how an aerodynamic module 25 can be attached to the shell 2. The aerodynamic modules 25 are preferably attached to an attachment element 44, 45, 47 in a detachable way, and, to be more precise, so that they are attached above through the upper attachment lips 42, 44 and below through the attachment part 47, for example with screws 51. A spacer element 45 can hold the attachment lip 44 and the attachment part 47 at a predetermined spacing with respect to one another. Adjustment elements (not shown) can also adjust the spacing between attachment lip 44 and the attachment part 47, as needed.

FIG. 9 also shows how a transition piece 43 can be installed over the aerodynamic module 25 on the shell 2 and/or, if necessary, on the aerodynamic module 25 in order to bridge the transition from the profile of the shell 2 to the profile of the aerodynamic module 25 smoothly so that as little discontinuity as possible of the surface between the shell 2 and the aerodynamic module 25 occurs. The transition piece can also be integrated into the aerodynamic module by the upper edge of the aerodynamic module being designed in such a way that it can be attached to the outer surface of the shell 2 without any substantial discontinuity.

Under wet, cold weather conditions, ice can form on the upper crown of the cooling tower, which ice can then detach itself and fall on the underlying shell surface. If the downfalling ice meets a substantial discontinuity in the surface, an impact can occur that can damage the surface.

The angle α between the outer surface of the shell 2 and the upper deflection surface 28 can also be selected in such a way that such an incident of falling ice does as little damage as possible to the deflection surface 28 of the aerodynamic module 25. The angle α is preferably between 10° and 40°. In the example depicted, the angle α is preferably between 15° and 30°.

The deflection surface 28 depicted in FIG. 9 is designed flat and even so that the manufacture of the aerodynamic module can be simplified. The deflection surface can also be designed differently, however, for example with a convex or concave curvature.

The transition between deflection surface 28 and diversion surface 26 can be seen as the inflection point or inflection line or inflection region 52 between the surfaces. Although the curvature of the diversion surface between inflection point 52 and the lower edge of the diversion surface does not have to be constant, one can speak of an average curvature, with a radius 38. The average radius of curvature 38 of the diversion surface 26 must of course be adapted to the geometry of the cooling tower as well as to the air inflow speed, etc. With a natural draft cooling tower, for example, the radius of curvature of the diversion surface is between 0.8 m bis 2 m. This radius of curvature 38 is also connected with a diversion spacing 39. The diversion surface should divert the air flowing down along the shell 40 outwardly before it is then drawn into the air inflow opening. The diversion spacing can be, for example, between 0.8 and 2 m.

Figure 10:
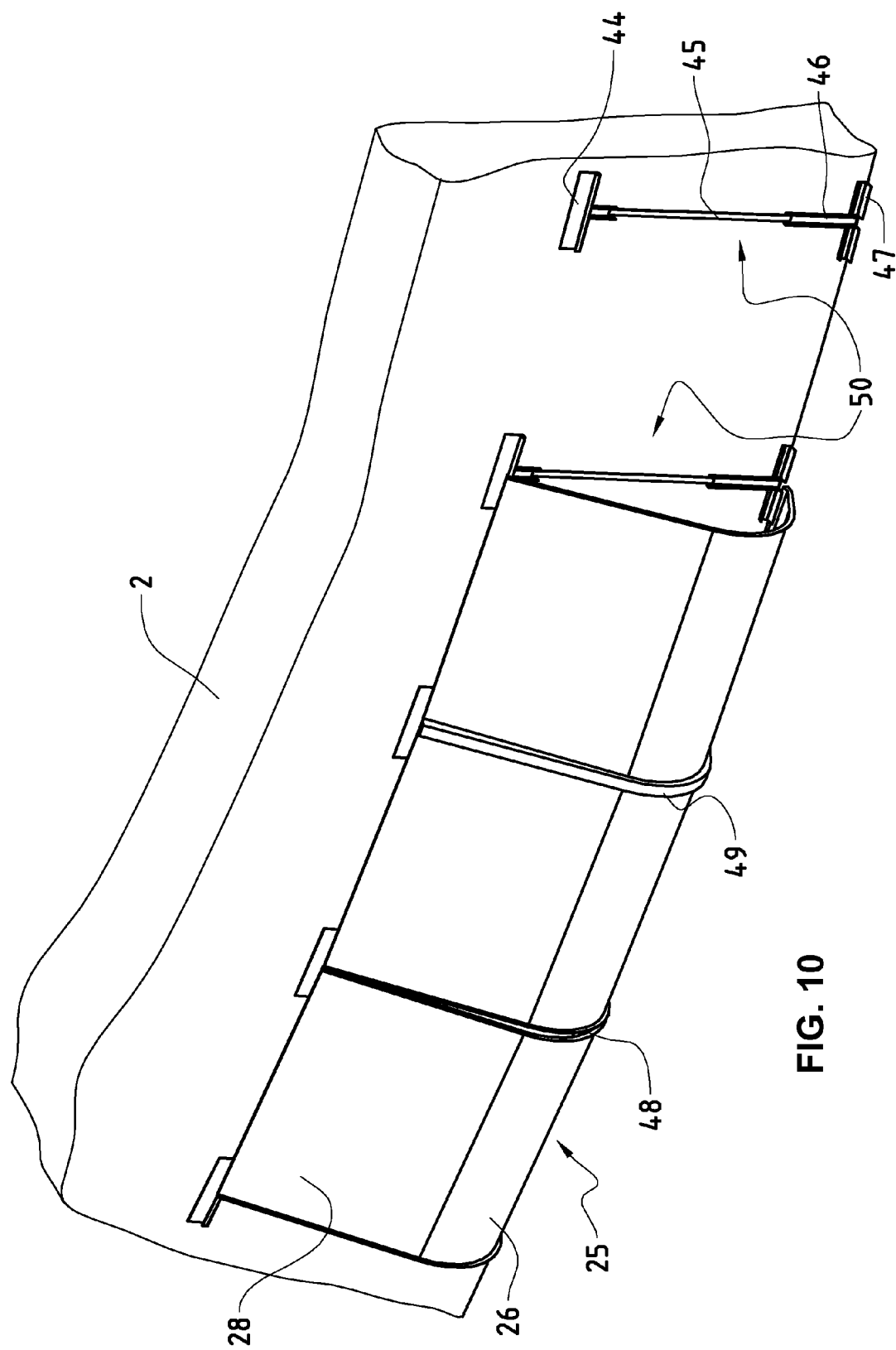
FIG. 10 shows in perspective view the mounting of a series of aerodynamic modules on the lower shell edge of a cooling tower.

FIG. 10 shows how a multiplicity of aerodynamic modules 25 can be mounted next to one another on the lower edge of a tower shell 2. In this example, first the attachment elements 50 are fixed on the tower shell 2. They are preferably attached at existing attachment points in the tower shell 2. Tower shells were often cast from concrete, and the molds necessary therefor were usually held temporarily together by screws or other attachments through the concrete. Such screws often remain set in concrete after the construction, and offer very stable attachment points. Where such screws were removed, the corresponding openings (holes) often still remain, which are likewise suitable as attachment points (e.g. with plugs) for the aerodynamic modules 25. Otherwise the attachment elements 50 can be fixed with adhesive (for instance epoxy), or respectively through the drilling of new (as small as possible) attachment holes. One tries to interfere as little as possible with the statics of the shell.

FIG. 10 also shows how the aerodynamic modules 25 do not have to be mounted closely together. In this example there are gaps 48 between aerodynamic modules 25. These gaps 48, which can be 5 mm to 40 mm wide, for example, can serve as thermal expansion gaps. If the aerodynamic modules 25 are made of metal, for example, and the tower shell 2 of reinforced concrete, then the aerodynamic modules 25 will thermally expand and contract considerably more than the tower shell 2. Such expansion gaps 48 can therefore prevent such additional thermal stresses in the aerodynamic modules 25 from being introduced into the statics of the tower shell.

Figure 12:
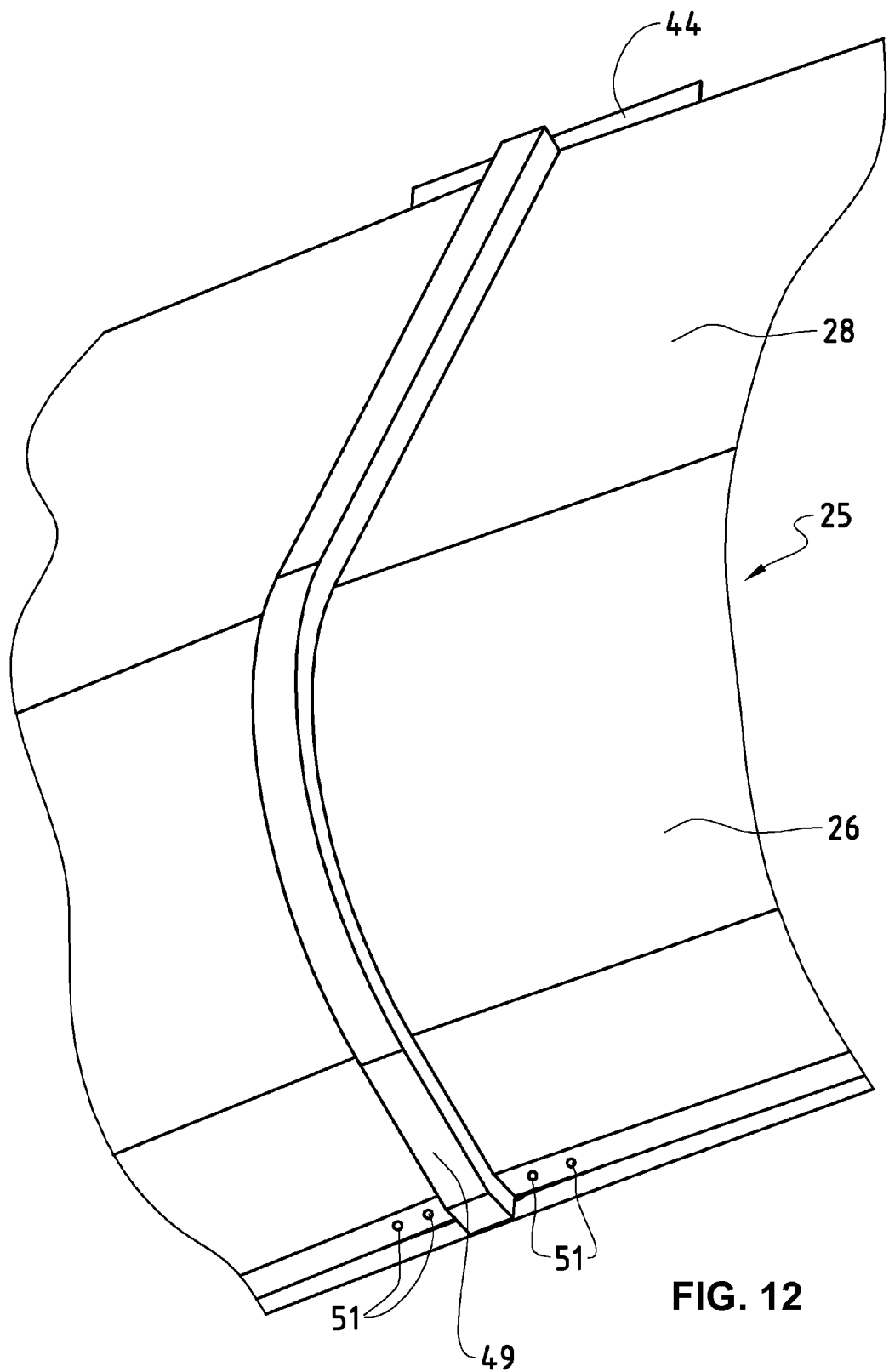
FIG. 12 shows in a perspective view how a gap between adjacent aerodynamic modules can be closed by means of a cover strip.

As depicted in FIG. 10 as well as FIG. 12, the gaps 48 can also be covered, for example by means of a cover strip 49, in order to improve the air flow and/or in order to prevent water seepage into the interior of the e.g. hollow body of the aerodynamic module 25.

Figure 11:
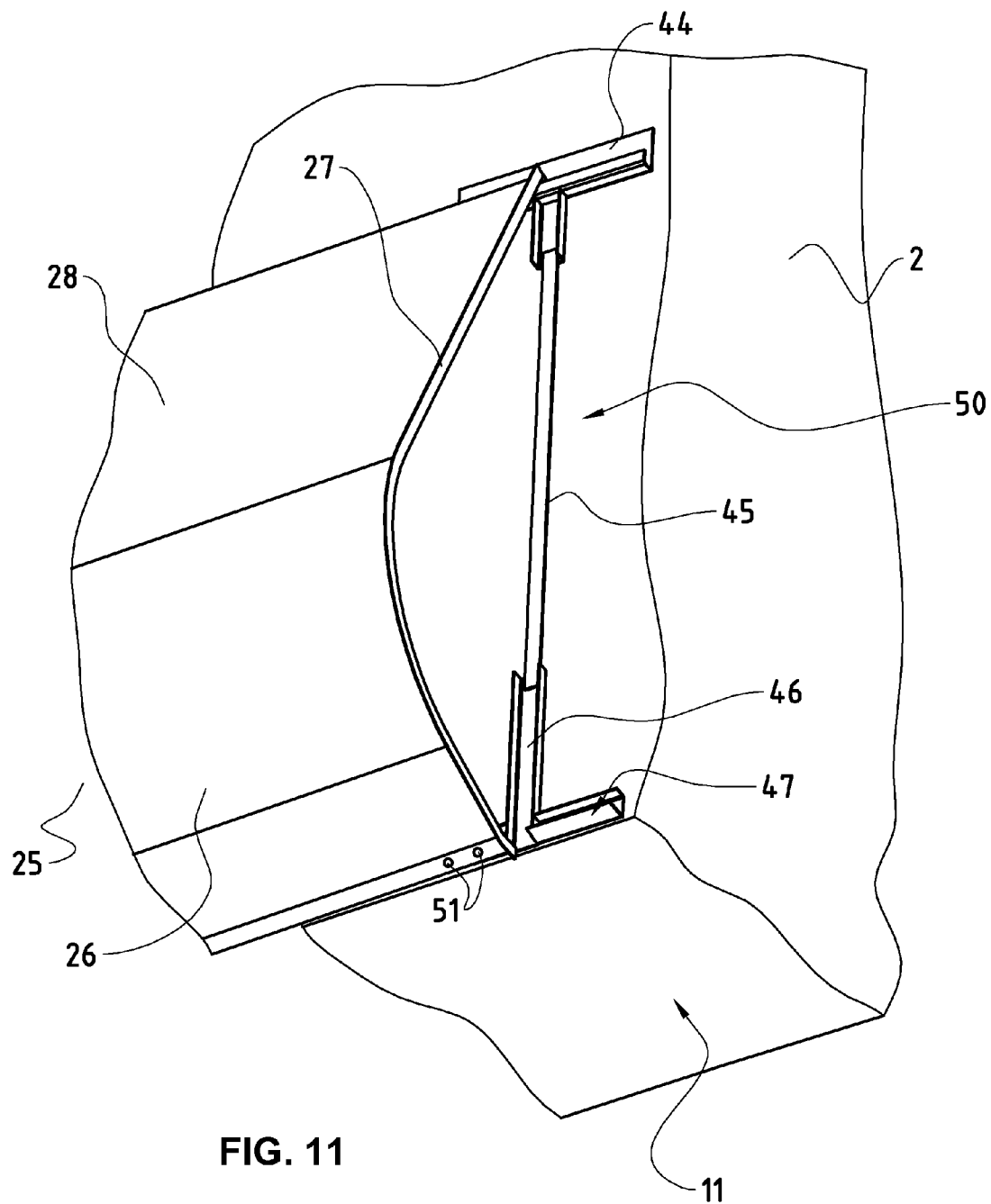
FIG. 11 shows in a perspective view how an aerodynamic module, depicted in FIG. 8, can be mounted.

FIGS. 10 and 11 also show somewhat more in detail how the aerodynamic modules 25 can be hung or respectively attached on the outer surface of the shell 2. In this example, each attachment element 50 is designed in such a way that it can hold two adjacent aerodynamic modules. In this way <the need for> an adjustment or respectively alignment of the lower and/or upper edges of the adjacent aerodynamic modules 25 can be avoided.

The function of the attachment lip 42, 44 has already been described with reference to FIG. 9. In a first step, the attachment elements 50 can be pre-installed on the tower shell 2. Then the individual aerodynamic modules 25 can be hung on, and/or attached to, the attachment elements 50. Thanks to adjustment elements (not shown), the spacing between attachment lip 44 and attachment parts 46, 47 can also be adjusted according to needs, in order, for example, to compensate for unevenness in the surface of the tower shell and/or different dimensioning of the aerodynamic modules 25.

The air inflow system, method and aerodynamic module 25 of the invention have been described above by way of examples. Further illustrations of the effect and the advantages of the invention will now be described in more detail in the following:

The design of the profiled elements 25 according to FIGS. 3b and 4A to 4D can be carried out in such a way that the air current during the acceleration phase at the air inlet 10 touches as closely as possible the bounding surface, optimally designed for this purpose, or respectively guiding surface of the fills 7 without becoming separated. Also before the point at which a separation of the stream becomes unavoidable, the stream continues to remain closely bound to the profiled elements 100 through one or more separation steps. Controlled separation stages, ocurring one or more times, are caused by discontinuities (inflection points, edges or other impediments, as indicated in FIG. 4) in the guide surface, in that the profiled elements allow a small eddy 118 to arise instead of a stream of turbulence (in FIG. 4D the enlarged detail is shown in each case). The eddy 33 makes possible a greater diversion of the stream, which subsequently lands again on a suitably shaped catching surface 26. The eddy 33 should remain stable with as little friction as possible.

The installation of a deflection plate 27 (FIG. 7b) could possibly be necessary. This device can consist of simple even surfaces or slightly curved plates, which can be used for subsequent adjustment of the air distribution. It can also be designed as a substitute for one of the above-described steps of the profiled element 33 or for support thereof through further separation stages. The deflection plate 27 can also be designed in cold climate regions with a view to possible snow loads.

With natural draft cooling towers the lower edge of the shell is usually of sharp design. In individual cases, the edge is merely rounded within the thickness of the shell, whereby this measure can offer only little positive effect in the depth of the stream. Greater measures protruding outwardly out of the shell have not been undertaken so far on site.

With air admission of natural draft towers, the air enters horizontally into the air inflow opening. This opening, owing to its height and inclined thermal exchange entry geometry on the shell, is only accessible with specially designed devices such as scaffolding. The circumference of the inlet openings on cooling towers is typically 300 and more meters.

There exists moreover the requirement of winterproof operation. A known bell mouth system on a cooling tower, with horizontal course around the tower, would be a distinct snow and hail trap whose weight would increase very quickly owing to the deposits of snow and ice, whereby the thereby arising high stresses can represent a risk to the whole construction. Timely removal of snow and ice at a height of 10 m during a snow or hailstorm would be almost impossible. Also with more favorable climatic conditions, bell-shaped and similar upwardly open forms could become problematic, e.g. owing to hailfall that occurs even in the tropics.

The aerodynamic modules 25 could be provided, on the other hand, with a protective covering with steep angle, and, if necessary, be designed to be self-cleaning in such a way that they prevent all deposits, or respectively deposits would slide off the forms immediately, without maintenance effort, before they could become compact.

A special problem which arises with natural draft cooling towers in frosty weather is the formation of icicles around the outlet opening around the crown of the tower shell. The icicles detach themselves and fall down as ice projectiles from the very top at high speed. The blocks of ice fall along the outer wall of the shell, and can hit the inflow aids with great force and rate of fall of about 200 kilometers per hour. Known bell-mouth inlet openings would not be able to withstand such impacts.

The aerodynamic modules 25 can be designed with protective coverings, so that they deflect such ice projectiles. The selected construction moreover provides for the use of tough, impact-resistant material for its manufacture in order to remain stable during hail or ice storms.

Seen from the point of view of structural engineering, the upper edge of the air inflow openings 10 is a heavily stressed element which can be exposed to heavy loads, above all during storm winds, possibly also forceful shaking motions, such as during earthquakes. Additional loads are to be kept as small as possible, and on the concrete parts of the tower there should not be any plugging or boring. Therefore the aerodynamic modules 25 can be designed as hollow bodies in lightweight construction. For mounting, already existing holes from the original sliding formwork can be used so as not to cause any further changes to the structure which are disadvantageous for the statics. Above all with subsequent installation of the profiled elements during the backfitting on existing towers, it is not permissible to bore into the structure or to otherwise put a considerable strain on it.

Moreover the construction of the aerodynamic modules 25 as "closed" inflow aids is to be considered as advantageous for corrosion protection of the underlying concrete structure and for the reinforcement construction of steel. These will practically not come into contact with rainwater at all, and are thus exposed to a much lesser extent to any environmental influences such as the interplay of rain, snow, sun and wind.

The size and stability of the inflow aids permit access to the interior by a person on foot in order to be able to inspect, when needed in future, the part of the covered concrete shell, including the reinforcement construction.

The previously described deflection plate 27 can be hung just below the profiled element 25, so that it likewise is protected by the upper deflection surface 28 and is not destroyed by impacts from ice.

A weak point of the conventional cooling towers, especially with natural draft cooling towers, lies in the sensitivity of their cooling efficiency with respect to wind on site. This has to do with the relatively modest velocity of the radial incoming air of the tower, which in the inlet region 10, at about 5 m/s, has the same order of magnitude as that of the moderate winds that often occur locally. The stream of air can be disturbed already at low velocity of the wind in the inlet region 10 of the cooling tower. The aerodynamic modules 25 can thus be equipped with radial guide plates or ribs 27 (this is clearly shown in FIG. 5). Such guide plates or ribs 27 stabilize the air current near the surface to the extent that disruptions of the operations of the device by local winds can be prevented or at least reduced.

Locally, during rain, a very large amount of water can run down on the side of the tower shell 2 turned toward the wind owing to the enormous surface area of the tower shell 2, which should not lead to an additional load, e.g. if applicable through retention of water in the hollow space of the aerodynamic modules 25. Therefore the aerodynamic modules can be provided with a water-discharge system so that the water is able to flow either around the aerodynamic modules 25 or through the aerodynamic modules 25. For this purpose a gap can be left open on the attachment edge of the deflection surface 28 toward the tower shell 2, so that the rainwater can flow freely behind the aerodynamic module 25. Additionally installed drains in the form of gaps or holes in the lower part of the aerodynamic module 25 also serve this purpose.

In the case of new constructions, the co-ordination into an overall measure takes place through design engineering of the tower, in the case of backfits, through inspection engineering of the existing situation, and in both cases by in particular the rain density distribution inside the tower and the design of the fills being configured optimally in order to achieve a maximum of benefit with respect to cooling efficiency in newly built, or respectively backfitted existing, cooling towers. For this purpose corresponding computing tools as well as databases derived from measurements have been developed from which the different parameters of the measure (profoundness and scope of the effects on rain, degree of the effects on the wind profile, extent of the measures for use of the dynamic components of the pressure) as well as the adaptations on the tower (rain density distribution and changes on the installation) can be derived.

Besides the use of the above-mentioned tools and databases, the capture of the actual state of the tower before and during the various stages of the backfit thus belongs to the correct engineering of the measures and their customization during backfitting projects. Belonging thereto are rain region-suitable instruments such as a rain region pitot 53 for measuring the air velocity and the static pressure in intensive rain. The sensor heads of these instruments are characterized in that, on the basis of shape and size, they are able to isolate the measurement procedure from the raindrop impact and capture the values of the air parameters (static pressure and back pressure) in a way undisturbed by the rain. The existing air current in the tower is thereby used for generation of the air stream through the instruments necessary for the measurement. Similarly, the air temperature is also captured in a way undistorted by the raindrop impact.

The results of the many measurements carried out have been condensed into databases, and two- and three-dimensional finite element programs have been developed for modelling the hydraulics, aerodynamics and thermodynamics of the towers, and it has been shown that with these tools the cooling towers can be computationally correctly simulated and that the engineering and the optimization of the measures mentioned in this description are thereby achieved.

In the design engineering, special attention has been paid to the suitability of the invention for backfitting projects. Besides the lightweight design, the adaptability to existing structures and their varying dimensional tolerances are to be taken into consideration here. A modular method of construction is used. The elements can, for example, be hung and/or attached in such a way that they are able to be adapted in a flexible way to differently located attachment points, even when the position of these attachment points has a greater margin of tolerance.

The above-described measures are presented here above all using the example of a natural draft wet cooling tower. They also find application however, following corresponding structural adaptation, with all types of cooling towers of power plants (such as, for example, with hybrids, with cooling towers operated with and without fans) and correspondingly with other cooling towers or other cooling devices used in industry.

Measurements have shown that the elimination of velocity peaks is decisive for the effectiveness and scope of the further measures foreseen in the rain zone for reduction of the pressure loss in the rain zone.

Since the resistance in the rain and the resistance at the inlet can behave as series-connected resistances, the contributions to the reduction of the overall resistance of these individual resistances cannot be fully beneficial until both have been reduced in the same way as far as reasonably feasible. The increase in the air quantity rises in a disproportionately greater way than the sum of the contributions thereof resulting from the individual measures.

The cooling towers, particularly the natural draft cooling towers among them, are hence devices of very great dimensions, probably the largest thermodynamic devices which even exist, and capturing them with measurement technology is very problematic. Especially difficult is the measurement of the physical parameters inside the rain zone, which has typically dimensions of 8 to 12 m in height and horizontal diameters of 22 to 120 m. The rain in the rain zone of the tower makes the air measurements considerably more difficult because the rain density in the tower with up to 5.0 $kg/m^2$ s is more than 11-times more intense than the density of the maximum observed tropical rain so far (measured as absolute record was a density of 0.12 $kg/m^2$ s of tropical rain in Schangdi, China, in 1947).

In the rain in the rain zone 8 powerful flow interactions with the air occur, which have to be eliminated in the measurements in order to obtain usable measurement values for the air parameters. With towers built until now, it was hardly possible in the past to study the physical parameters in the rain zone. The positioning of measurement sensors in these zones has proven to be very difficult, and the measurements have yielded greatly varying results with respect to time and place, which are not usable. Thus decisive procedures in these simply structured but gigantic facilities have remained quantitatively largely unknown until now.

Up until today one was content with capturing in selective measurements easy-to-determine data such as e.g. temperature and humidity of the inflowing air, of the hot water conducted in and of the cold water conducted out. Such parameters are indeed suitable for input in simple numerical models (one speaks of point models), and this may also have sufficed for the approximate empirical calculation for cooling towers. These measurements, however, do not suffice when searching for measures for a genuine improvement of the cooling efficiency of a tower, for which a good knowledge of the pressure conditions in the turbulent air current, in particular in the rain zone of the tower, is necessary.

In view of the above-mentioned problems, within the context of the investigations described here for preparation of the present invention, new designs and procedures of a measurement technical nature and using technical equipment had to be developed with which new findings could be obtained concerning the local currents and pressure processes in the rain zone of the tower. First, with little success, attempts were made over years to learn something about the conditions in the rain zone using pressure sensors introduced from outside via poles or rods. These failures in the measurements were to be attributed at least partially to disturbances from the water on the pressure sensors for the air, but also partially to natural pulsations at the draft of the tower. Added to that was that it was not possible to reach with poles far enough into the rain zone and the positioning could be carried out only very imprecisely.

Finally more complex measurement campaigns had to be carried out in which at cooling towers in Leibstadt and Gösgen (both sites in Switzerland) the prerequisites for reliable, usable measurements were able to be developed. In addition, special protective measures for separation of the phases air and water at the sensor heads were introduced against distortions in the measurements from the rain. Sufficiently long running rails and telescopic drives 156 (indicated in FIG. 5) were installed for the precise positioning of the measurement heads deep in the rain zone in the towers of these two power plants. The measurement sensors were designed in such a way that the influence of the water could be completely excluded during the measurements of the air parameters; see as example the rain zone pitot sensor 155 in FIG. 5.

These measurements with the new devices were finally successful. Contrary to earlier assumptions that the rain has only a moderate effect on the losses, it was shown that the curtain of rain acts instead as a barrier with extremely powerful constricting effect on the air stream, so that, inside the rain, after a few meters of flow path, up to about 75% of the overall draft of the cooling tower is destroyed. The partial losses through the rain front alone—with about ⅔ (namely 50% of the overall draft) and through the impediments of the structure at the inlet with ⅓ (25% of the overall draft)—contribute to the losses. Only about 25% of the draft is made use of for useful work to overcome the resistance of the active part of the tower (i.e. in its thermodynamic fills).

These measurement results were checked for consistency by means of control measurements, and were confirmed with alternative testing methods. In Gösgen and Leibstadt separately carried out measurements always yielded similar and consistent results.

A very great specific drag factor for the rain prevails, measured in radial direction, far exceeding all other losses.

Losses are concentrated in a radial region going outward from the front border of the rain to about a depth of 5 m into the rain, where a visible interaction with powerfully turbulent formations of the wind field and of the curtain of rain occurs.

Structural impediments further promote the undesired non-homogeneous distribution of the air velocity.

The generation of a pressure of the falling water is observed acting against the draft of the tower.

The losses through the rain are for the most part dissipative, and cannot be recaptured.

The above-described measures can be adapted individually, or in combination, to different sizes and shapes of rain zones and peripheral areas, e.g. to wet, dry and hybrid coolers with natural air draft or air draft generated by fans. They should also be usable in plants equipped with noise protection, and in particular in new constructions as well as in existing plants, as backfit.

They can be preferably designed in such a way that they are able to fulfil their task under all meteorological conditions as far as possible over the entire life of the power plant or other industrial plant, in winter operation through tower-external measures against snow loads and through tower-internal measures against ice loads.

The measures can preferably be designed in such a way that they can be constructed cost-efficiently and they fulfil their specific task with as minimal an amount of maintenance as possible.

Such measures can also be adapted to other types and shapes of coolers, such as cell cooling towers, which usually have a rectangular base form, or be adapted to air condensers and various types of fan blade coolers.

Of course the improvement measures described here can be adapted to the operating conditions of each individual cooling tower because the following particularly relevant parameters can be different with each tower: base diameter or base length of the tower, diameter of the curtain of rain 13 in the periphery, height level of air impediments on the periphery (lower edge 11 of the shell 2 of the tower, lower edge 41 of the fills 7, upper edge 23 of the pool rim and the height of the water level in the pool 9, rain density 13 at the periphery, number and shape of supports 4 and 12 of the shell 2 or respectively of the fills 7), and finally the available chimney effect of the shell 2 or the corresponding air capacity of the cooling tower.

We claim:

1. A system for increasing an aerodynamic supply of cooling air from the surrounding area of a cooling tower through an air inflow opening into an interior of the cooling tower, the cooling tower having a tower shell, the tower shell having a shell edge forming a bounding edge of the air inflow opening, the system comprising a plurality of aerodynamic modules detachably mounted on an outer shell face of the tower shell at the bounding edge of the air inflow opening of the cooling tower, without constricting air flow through the air inflow opening, wherein each of the aerodynamic modules has a deflection surface that diverts an airflow which flows along the outer face towards the air inflow, such that the airflow is diverted radially outwards away from the outer face before flowing around the shell edge and into the air inflow opening of the cooling tower.

2. The system according to claim 1, wherein the cooling tower comprises:
   heat exchange elements in the shell;
   an inner rain zone;
   a rain collection pool; and
   an outer, air intake zone, wherein rain in the inner rain zone falls substantially unobstructed to the collection pool,
   wherein the inflowing air is drawn into the inner rain zone through the air intake zone, the system having at least one rain collection element disposed in the air intake zone that collects and conveys away at least a portion of the rain drops in the air intake zone.

3. The system according to claim 1, each of the aerodynamic modules being formed as a hollow body.

4. The system according to claim 3, the hollow bodies forming or having at least one conduit for the passage of lines, pipes or cables.

5. The system according to claim 3, the hollow bodies having water passages and/or drainage openings.

6. The system according to claim 1, each of the aerodynamic modules also having a diversion surface that guides air pushed outward from the deflection surface along a diversion curvature into the air inflow opening.

7. The system according to claim 6, wherein the deflection surface guides an object falling down along the outer surface of the tower shell substantially smoothly onto the deflection surface without discontinuity and pushes the falling object radially outward from the tower shell.

8. The system according to claim 3, the aerodynamic modules being attachable to one another to form a walkway through the hollow bodies.

9. The system according to claim 1, wherein the aerodynamic modules are situated side by side, wherein interim gaps extend between the aerodynamic modules.

10. The system according to claim 1, a lower edge of the air inflow opening being provided with an aerodynamic diversion ramp that diverts an airflow which flows along a ground surface towards the air inflow, such that the airflow is diverted upwards away from the ground surface before flowing over the lower edge of the air inflow opening.

* * * * *